United States Patent [19]

Talley et al.

[11] Patent Number: 4,475,975

[45] Date of Patent: Oct. 9, 1984

[54] DECORATING COATED ALUMINUM FOR EXTRUSION ENCAPSULATION

[75] Inventors: Paul E. Talley; Harry T. Rochford, both of Dayton, Ohio

[73] Assignee: General Motors Corporation, Detroit, Mich.

[21] Appl. No.: 218,024

[22] Filed: Dec. 19, 1980

[51] Int. Cl.³ .......................... B44C 1/14; B44C 3/00; B32B 31/00; C09J 3/02

[52] U.S. Cl. .................................... 156/234; 156/240; 156/241; 156/238; 156/333; 156/540; 156/582; 428/914; 428/209

[58] Field of Search ................ 156/233, 238, 230, 240, 156/247, 289, 542, 540, 582, 280, 234, 235, 241, 249, 231, 307.7, 309.6, 333, 334, 344; 428/914, 68, 76, 209, 681, 31; 427/153, 147; 29/469.5, 527.2, 568, DIG. 1, 62

[56] References Cited

U.S. PATENT DOCUMENTS

| | | | |
|---|---|---|---|
| 1,931,333 | 10/1933 | Taylor | 156/231 |
| 2,559,649 | 7/1951 | Little et al. | 154/97.5 |
| 2,614,953 | 10/1952 | Anglada | 154/42 |
| 3,046,174 | 7/1962 | Brooks et al. | 428/31 |
| 3,415,706 | 12/1968 | Ettre | 156/540 |
| 3,434,861 | 3/1969 | Luc | 156/234 |
| 3,442,742 | 5/1969 | Jorgensen | 156/233 |
| 3,510,388 | 5/1970 | Hunt | 428/209 |
| 3,971,692 | 7/1976 | Anderson | 156/241 |
| 4,010,297 | 3/1977 | Wenrick | 428/31 |
| 4,231,828 | 11/1980 | Mintz | 156/238 |
| 4,231,831 | 11/1980 | Gebhardt | 156/235 |
| 4,243,464 | 1/1981 | Potchen et al. | 156/540 |
| 4,318,953 | 3/1982 | Smith et al. | 156/234 |

FOREIGN PATENT DOCUMENTS

| | | | |
|---|---|---|---|
| 195926 | 4/1907 | Fed. Rep. of Germany | 156/233 |

*Primary Examiner*—Edward Kimlin
*Assistant Examiner*—Louis Falasco
*Attorney, Agent, or Firm*—Elizabeth F. Harasek

[57] ABSTRACT

A method is provided for accurately laying down a well-defined decorative ink stripe on an elongated metal strip. In the method, a laminated hot stamp foil is calendered in printing engagement with the metal substrate strip between a grooved metal roller and a heated resilient roller having a peripheral printing tongue. The pressure of the tongue on the hot stamp foil precisely transfers the ink stripe onto the metal strip.

4 Claims, 6 Drawing Figures

DECORATING COATED ALUMINUM FOR EXTRUSION ENCAPSULATION

This invention relates to applying a contrasting stripe of ink to a metal trim strip. The invention relates more particularly to transferring a heat softenable decorative stripe from a hot stamped foil onto a bright metal foil strip.

An attractive trim effect has been provided to many articles by overlaying a thin bright metal strip with a narrower thin strip of contrasting color or design. Generally both strips are then fixed in position and supported by encapsulation in clear plastic.

For example, rims of injection molded automotive steering wheels have been decorated to create the impression of a narrow strip of wood inlaid in a wider bright metal strip. Heretofore, two separate strips have been required to create this appearance. A wood grain pattern was printed on an aluminum foil. A narrow strip of the printed foil was then coextruded with a wider bright aluminim foil and a clear thermoplastic resin through a crosshead extrusion to form a finished trim strip in which the printed foil was laid over the bright foil. The composite extrusion had a protruding fastening portion for attachment to the wheel rim.

The process of coextruding two strips in a manner such that the contrasting strip is accurately and consistently laid down in the center of a bright metal strip is difficult to control and expensive. Therefore, it would be preferred to print a durable stripe on a bright metal strip and thereafter subject the printed strip to the encapsulation process if desired. Any such method would have to be continuous and relatively inexpensive. The finished product would have to be able to withstand later processing, including coextrusion with a transparent resin. Thus, we set out to find a process by which a decorative contrasting stripe could be accurately and consistently laid down on the type of bright aluminum strip used as steering wheel trim.

OBJECTS OF THE INVENTION

It is therefore an object of the invention to provide a method of applying a well defined stripe of contrasting ink onto a metallic trim strip.

A more specific object is to provide a method for transferring an ink stripe from a hot stamp foil lengthwise onto the surface of a metallic strip to leave at least one uncoated margin thereon. A more particular object is to calender or roll a metal strip and hot stamp foil between a resilient printing tongue and a hard platten roller, each preheated to a different desired transfer promoting temperature, to transfer a contrasting ink stripe from the foil to the strip. Another object of the invention is to provide a method of decorating a metallic trim strip with a contrasting ink stripe that will stand up to later processing, such as encapsulation in a clear resin, without spoiling either the stripe or the original metallic strip.

BRIEF SUMMARY OF THE INVENTION

In a preferred practice of the invention, a decorative pattern stripe was laid down along the center of an elongated metal foil trim strip leaving uncoated metallic margins on either side of the stripe. The metal strip was aluminum foil coated with a heat soft-enable lacquer. In the process, the strip was continuously advanced around a metal roller in a groove that served to precisely locate the strip. Concomitantly therewith, a strip of a hot stamp foil, carrying the pattern to be transferred to the aluminum strip, was calendered in printing engagement with the strip between the grooved roller and a resilient roller having a peripheral printing tongue. The tongue was the width of the stripe and narrower than the groove. It is the relative position of the tongue in the groove of the metal roller that precisely laterally aligns the printed stripe on the foil strip. The resilient roller was heated to the hot stamp transfer temperature of the foil. The grooved roller was heated by contact with the resilient roller and cooled as necessary to maintain the aluminum foil at an elevated temperature where the lacquer coating of the strip was receptive to the ink. The application of pressure between the resilient tongue and the metal roller caused the desired portion of the ink on the hot stamp foil to be transferred onto the center portion of the metal strip. Thereafter, the hot stamped foil and aluminum strip were retained in mating engagement until cooled to a temperature below the ink transfer and lacquer softening temperatures. The foil offal and printed strip were then separated and taken up on separate reels.

Thus, a decorative metal trim strip with a precisely defined ink stripe may be made which is resistant to wear and adaptable for further coating, extruding or other processing steps.

DETAILED DESCRIPTION OF THE INVENTION

The objects and advantages of the invention will be better understood in view of the following figures and specific example.

In the Figures.

Figure 2:
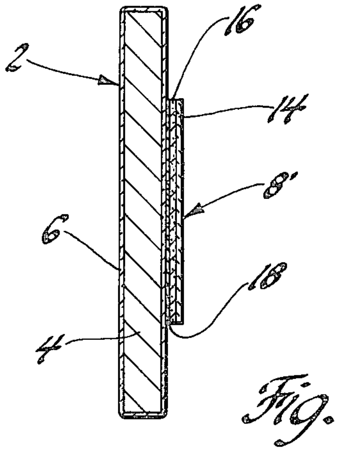
FIG. 2 is an enlarged sectional view taken along 2—2 of FIG. 1.
Figure 3:
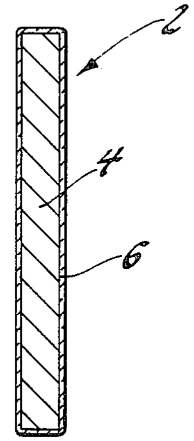
FIG. 3 is an enlarged cross-sectional view of the lacquer coated metal strip of FIG. 1.

Referring to FIG. 3, a preferred substrate strip 2 for the practice of my invention is shown. The size and thickness of the foil strips depicted in FIGS. 1–4 have been exaggerated for purposes of illustration. However, it is to be understood that our process is particularly useful in handling thin delicate substrate webs and printing foils. Strip 2 comprises a metal strip 4 coated with a thermoplastic lacquer 6. Such strips are preferably made of flexible metals such as aluminum, steel, nickel, or other metals or alloys. Metal coated strips of polymers, paper or other materials would also be useful. The metal strips are preferably precoated, at least on the side to be provided with a hot stamped pattern, with a thin coat of lacquer which is compatible with the hot stamp ink and adhesive to be later applied. If the strip is to be later encapsulated in a clear resinous material, the lacquer coating should also be compatible therewith. In fact, a lacquer coating on the strip or foil may be deemed necessary to facilitate wrinkle free encapsulation in some clear resins such as poly vinyl chloride and cellulose acetate propionate. Preferably, the lacquer coating is thermoplastic so that it can be softened and made more receptive to the ink by a gentle heating prior to the hot stamp foil transfer operation. We prefer lacquers based on poly vinyl chloride or cellulose acetate propionate resins because they are clear and like resins may be used to encapsulate a printed strip. However, other thermoplastic or heat softenable thermoset resins would also be suitable. The lacquer is preferably transparent to allow the metal to show through. It may be tinted as desired.

Figure 4:
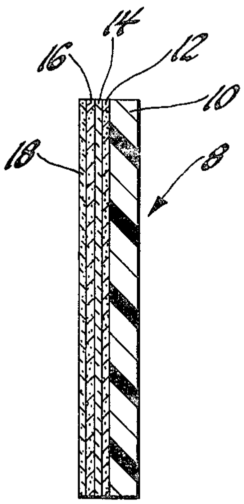
FIG. 4 shows an enlarged cross-sectional view of a multi-layered hot stamped foil used in the subject process.

FIG. 4 shows a preferred hot stamp foil laminate 8 for use in the invention. Its several layers include a base layer 10 of a thin, flexible but fairly strong strip of polymer or other material that is not adversely affected by the elevated hot stamping temperatures. Suitable hot stamp foil substrates would include films of such substances as polyethylene terephthalate, paper, metal foil, or other such suitable materials. A thin release coat 12, e.g., a high molecular weight wax, lies adjacent substrate 10. This release coat assists the transfer of the printed pattern from the base layer onto the metal strip substrate. Adjacent release coat 12 is a protective layer 14 of a clear resin which overlays the ink after it is transferred. Adjacent protective layer 14 is a printed ink layer 16. It is typically applied over layer 14 by rotogravure printing. The ink itself generally comprises a pigment, a plasticizer, and a vinyl or acrylic binder. The binder should be heat softenable without adversely affecting the printed design, color, texture or other properties of the ink. A thin adhesive layer 18, compatible with lacquer coating 6 on metal strip 4, overlays ink layer 16. The adhesive contributes to the adhesion between lacquer coat 6 and ink layer 16. Layer 18 should have adhesive properties at the hot stamp transfer temperature and provide good ink adhesion at cooler temperatures.

Figure 1:
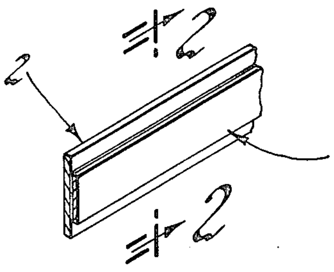
FIG. 1 is an enlarged perspective view of a lacquer coated metal strip on which a decorative ink stripe has been applied in accordance with the invention.
Figure 6:
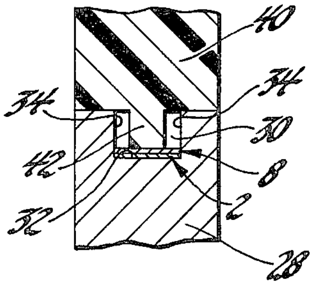
FIG. 6 is taken along line 6—6 of FIG. 5 and shows the resilient printing tongue disposed within a groove in the metal impression cylinder with the metal strip and hot stamp foil therebetween.
Figure 5:
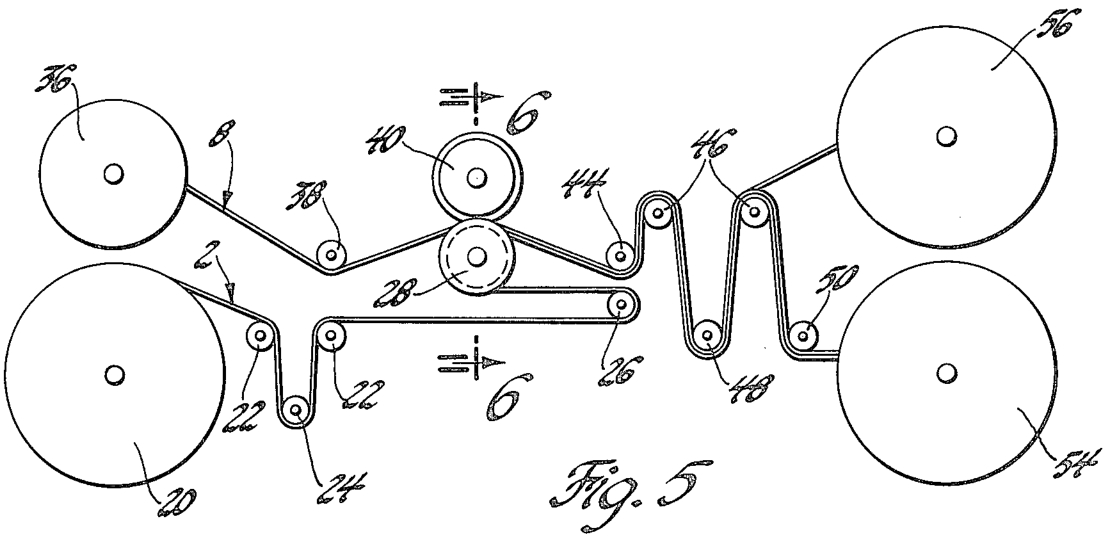
FIG. 5 is a diagrammatic view of a hot stamp transferring apparatus suitable for use in the invention.

FIG. 5 shows a schematic representation of apparatus for processing the strip of FIG. 3 and hot stamp foil of FIG. 4 to yield a trim strip of the type shown at FIGS. 1 and 2. In a preferred embodiment, a strip 2 of aluminum metal with a highly polished surface that is 0.171 inches wide and 0.005 inches thick is retained on payoff reel 20. Aluminum strip 2 is coated with a very thin layer of vinyl based lacquer. As strip 2 is paid off reel 20, it runs through guide rollers 22 and tensioning roller 24. From guide roller 22 it is fed through lead roller 26 onto thermally conductive metal impression cylinder 28. As best seen at FIG. 6, impression cylinder 28 has a peripheral groove 30 with a flat base 32 and perpendicular walls 34. The width of groove base 32 is equal to the width of strip 2. The groove precisely locates the strip 2 and causes it to run smoothly about cylinder 28. A hot stamped transfer foil 8 is retained on payoff reel 36 and run through a tensioning lead cylinder 38. Foil 8 comes into hot stamping engagement with the metal strip 2 in groove 30 of impression cylinder 28. Hot stamped foil 8 is oriented on printing roll 40 so that adhesive layer 18 lies adjacent the metal strip 2 in groove 30 and substrate layer 10 comes into mating engagement with a resilient printing tongue 42 about its periphery. Printing roller 40 is retained at a temperature of 198° C. (410° F.). At least tongue 42 of roller 40 is made of a resilient polymeric material that is tolerant of such temperatures such as silicone elastomer. Roller 40 is heated by an external heater and is driven in a counterclockwise direction by known means (not shown).

Metal impression cylinder 28 is heated by contact with heated roller 40. The preferred operating temperature range for the vinyl coated aluminum strip is about 55° to 70° C. (160°–180° F.). Because the printing roller is at a much higher temperature, impression roller 28 is cooled as necessary by ambient air blown over its surface. The roller we used was made of cast aluminum mounted on a green glass core. The aluminum roller was tensioned into biasing engagement (means not shown) with printing roller 40 and was driven thereby. Lead roller 26 directed strip 2 over 180° of impression cylinder 28 so that the strip was substantially at the temperature of the roller by the time it came into engagement with hot stamped foil 8. At this elevated temperature, lacquer coating 6 on aluminum strip 2 was receptive to the transfer of ink 16.

Aluminum strip 2 and hot stamp foil 8 are calendered together through impression cylinder 28 and printing roller 40. Referring to FIG. 6, hot stamp foil 8 is pressed against the metal strip 2 in printing relation by elastomeric silicone roller tongue 30. The tongue presses the adhesive coated preprinted ink surface of the hot stamped foil down on the aluminum strip only along the center leaving an unprinted edge on either side of the printing tongue. The relative position of the resilient tongue in the groove precisely locates the printed stripe on the strip. Obviously, the tongue may be located wherever it is desired to apply the design. The elevated temperature of the printing tongue carried on the plate cylinder activates the release coat of the hot stamped foil, softens the thermoplastic ink, and activates the adhesive layer. Referring to FIG. 1, this calendering step yields a well defined stripe of ink 8′ along the center of the bright aluminum foil strip 2. As seen at FIG. 2, stripe 8′ consists of adhesive layer 18 which bonds ink layer 16 to the lacquer coating 6 of strip 2. Ink layer 16 is overlayed with protective layer 14. Any residual release agent 12 and substrate foil 10 are carried with the hot stamp foil offal.

Referring again to FIG. 5, after passing through the printing roller, the aluminum strip and hot stamped foil are carried together through a guide roller 44. From there the strip and foil are run through guide rolls 46 and tensioning roll 48. The strip and hot stamp foil are thereby air cooled so that the polymeric materials, softened during printing, set up. Thereafter, the hot stamp foil offal which consists of the Mylar® backing and any residual ink which has not been transferred to the foil is wound up on take-up reel 56. Aluminum strip 2 with decorative central ink bead 8′ is directed through leader 50 onto driven take-up reel 54. The wood grain striped aluminum strip may be taken from reel 54 for additional processing such as encapsulation by coextrusion with a transparent resin, coating with a protective resin layer or use directly as printed.

While we have described our invention in terms of laying down a uniform stripe in the center of the bright aluminum strip, other designs could be readily transferred in accordance with the method. The pattern could be provided on the printing tongue which could lay down the ink from the hot stamped foil in a desired intricate pattern along any lateral portion of the strip.

Thus we have provided a method of making elongated bright metal strips carrying a well-defined decorative stripe interior to the edge of the strip by a rapid and inexpensive process. While my invention has been described in terms of a specific embodiment thereof, other forms may be readily adapted by one skilled in the art. Therefore my invention is limited only by the following claims.

The embodiments of the invention in which an exclusive property or privilege is claimed are defined as follows:

1. A method of making an elongated bright aluminum strip carrying a longitudinally oriented ink stripe having well-defined edges interior to the edges of said strip, comprising:

continuously advancing a bright aluminum strip coated with a lacquer based on one or more polymers taken from the group consisting of vinyl chloride and cellulose acetate propionate polymers under tension in a channel of like width, said channel being located on a circumference of a thermally conductive metal impression cylinder;

advancing an elongated tensioned hot stamp foil laminate consisting essentially of a flexible polymeric substrate layer, a release layer, a clear protective coating layer, an ink layer defining a desired decorative pattern, and an adhesive layer along with the aluminum strip in the cylinder channel, the adhesive surface of the foil running adjacent lacquer surface of the aluminum strip;

rotating a resilient plate cylinder in printing engagement with the metal impression cylinder such that the impression cylinder is driven by the plate cylinder and such that a circumferential printing tongue carried on the surface of the plate cylinder is disposed within a portion of the channel to impress the desired decorative stripe onto the aluminum strip, said resilient plate cylinder being maintained at an elevated temperature to soften the ink layer of the hot stamp foil laminate;

maintaining the aluminum strip in contact with the hot stamped foil and cooling said strips to a temperature whereat the ink pattern sets on the aluminum foil; and thereafter separating the striped strip from the hot stamped foil and residual pattern thereon.

2. A method of making an elongated metal trim strip, the show surface of which carries a longitudinally oriented ink stripe having a well-defined edge interior to the edge of the strip, comprising continuously advancing a metal strip coated with a thermoplastic layer comprising one or more polymers taken from the group consisting of vinyl chloride and cellulose acetate propionate polymers in a channel of like width, said channel being located on the circumference of a thermally conductive metal impression cylinder;

calendering an elongated hot stamp foil along with the strip in the cylinder channel, the foil comprising a heat softenable transfer ink disposed on a film carrier with a release coat layer therebetween;

rotating a resilient plate cylinder in printing engagement with the metal impression cylinder such that the impression cylinder is driven by the plate cylinder and such that an elastomeric circumferentially oriented printing tongue carried on the surface of the plate cylinder is disposed within a portion of the channel to transfer the desired stripe of heat softenable ink from the hot stamp foil onto the strip;

concomitantly heating the plate cylinder to maintain the hot stamp foil at an elevated temperature whereat the transfer ink is in a heat-softened state and the impression cylinder is heated by contact therewith;

cooling the impression cylinder as necessary to maintain the metal strip at a lower elevated temperature than the plate cylinder temperature whereat the strip receives and sets the decorative stripe pattern; and cooling the strip to a temperature below the ink transfer temperature and separating the striped strip from the hot stamp foil and residual pattern thereon.

3. A method of transferring an ink stripe from a hot stamp foil laminate lengthwise onto an elongated metal strip encapsulated with one or more polymers taken from the group consisting of vinyl chloride and cellulose acetate propionate polymers so as to leave at least one uncoated margin, the method comprising, continuously advancing a said metal strip over a heat conductive roller, the lateral position of the strip being precisely located by a groove therein, the strip having a transparent thermoplastic coating film comprising the said one or more polymers on the stripe transfer surface, controlling the temperature of the grooved roller and the period of its contact with the metal strip such that said coating film is heat softened, concomitantly passing a said hot stamp foil carrying the ink to be transferred over a sector of a resilient roller having a peripheral tongue the width of the stripe to be applied to said metal strip, said hot stamp foil being wider than said tongue and overlying it, said tongue in its operative position rolling in said groove and precisely locating said stripe, controlling the said temperature of said tongued roller and the duration of contact of said hot stamp foil therewith to heat said foil to an ink transfer temperature, running said hot stamped foil between said tongue and the roller thereby impressing the pattern onto the softened film of said metal strip to thereby transfer an ink stripe the width of said tongue onto the strip, and cooling the said strip and foil to a temperature below the ink transfer temperature and thereafter separating the striped metal strip from the hot stamped foil and residual pattern thereon.

4. A method of making an elongated bright aluminum strip carrying a longitudinally oriented ink stripe having well-defined edges interior to the edges of said strip, comprising:

continuously advancing a bright aluminum strip under tension in a channel of like width, said channel being located on a circumference of a thermally conductive metal impression cylinder and the stripe bearing surface of said aluminum strip having a polymeric thermoplastic coating layer taken from the group consisting of vinyl chloride polymer and cellulose acetate propionate polymer;

advancing an elongated tensioned hot stamp foil laminate consisting essentially of a flexible polymeric substrate layer, a release layer, a clear protective coating layer, an ink layer defining a desired decorative pattern, and an adhesive layer along with the aluminum strip in the cylindrical channel, the adhesive surface of the foil running adjacent the coated surface of the aluminum strip;

rotating a resilient plate cylinder in printing engagement with the metal impression cylinder such that the impression cylinder is driven by the plate cylinder and such that a circumferential printing tongue carried on the surface of the plate cylinder is disposed within a portion of the channel to impress the desired decorative stripe onto the coated aluminum strip, said resilient plate cylinder being maintained at a temperature between about 160°–180° C. and said metal impression cylinder at a temperature between about 55°–70° C.;

maintaining the aluminum strip in contact with the hot stamped foil and cooling said strip to a temperature whereat the ink pattern sets on the coated aluminum strip; and thereafter separating the striped aluminum strip from the hot stamped foil and residual pattern thereon.

* * * * *